July 12, 1960

G. H. DAVIS 2,945,210

ROTATING TAILLIGHT REFLECTOR

Filed April 4, 1957

INVENTOR.

BY *Gilbert H. Davis*

United States Patent Office 2,945,210
Patented July 12, 1960

2,945,210

ROTATING TAILLIGHT REFLECTOR

Gilbert H. Davis, 1406 Greenleaf Drive,
Royal Oak, Mich.

Filed Apr. 4, 1957, Ser. No. 650,631

2 Claims. (Cl. 340—72)

The present invention relates to a signal device generally, and more particularly to a rotating reflector adapted to be inserted in the taillight bulb receptacle of a motor vehicle.

With the advent of high speed motor vehicle travel characterized by long lines of fast moving vehicles, a need has developed for a safety device that gives a positive indication of vehicle braking. The system of brake lights, presently standard equipment on motor vehicles, has proved inadequate at such times as the vehicle's taillights are energized, as braking of the vehicle is indicated only by relative light intensity. In a line of traffic a driver sees many taillights of varying intensities ahead of him and is given no positive warning of brake application unless his attention is directed to the particular vehicle braking, at the instant of braking.

Accordingly, an object of the present invention is a signal device that gives positive indication of vehicle braking.

A further object of the present invention is a signal device that gives a moving signal upon brake application of a vehicle equipped with the device.

A further object of the present invention is a signal device that gives a moving indication of brake application and is adapted to be inserted in a conventional taillight bulb receptacle.

A further object of the present invention is a signal device adapted to fit in a taillight bulb receptacle, that permits the taillights, brakelights, and turn signals to function in their normal manner.

The novel features of the present invention both as to structural organization and method of operation, will be better understood from the following description considered with the accompanying drawing in which one embodiment of the invention is illustrated. It is to be expressly understood however, that the drawing is for the purpose of illustration only and is not intended as a definition of the limits of the invention.

The signal device of the present invention consists of a rotating reflector adapted to focus a portion of the light from a conventional taillight bulb, into a beam projected at an angle to the axis of rotation of said reflector. As the reflector rotates, the beam traces out a circle on the lens of the taillight in which the device is mounted. A driver to the rear of a vehicle equipped with the signal device of the present invention will see a spot of light tracing out a circle on each taillight lens upon application of the brakes of said vehicle.

Rotation of the reflector is accomplished by a small D.C. motor having an annular armature which rotates about a stator, the base of which is the size and configuration of a conventional taillight bulb. The stator has a receptacle adapted to receive the bulb originally carried in the taillight bulb receptacle of the vehicle.

Figure 1:
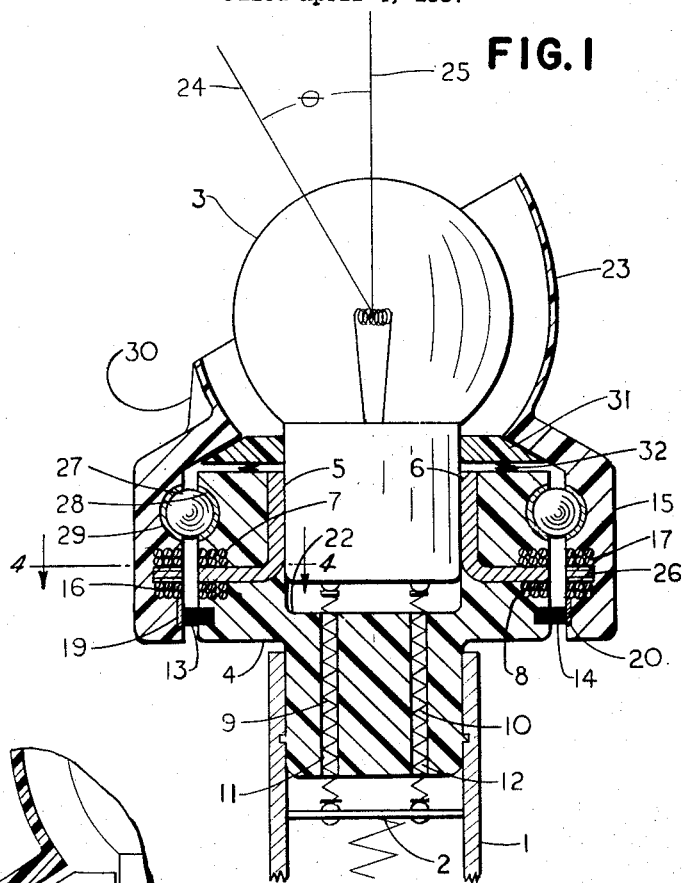
Figure 1 is a sectional view of a preferred embodiment of the invention, enlarged for clarity.

Referring to Figure 1, a conventional taillight bulb receptacle 1 is shown with a spring biased contact disc 2. A conventional bulb 3 normally carried by receptacle 1 is shown in operative position in bulb cavity 22 of stator frame 4. Stator frame 4 is provided with a base section having the size and configuration of bulb 3 in order to be readily accepted in receptacle 1. Stator frame 4 is provided with pole pieces 5 and 6 of magnetizable material surrounded by coils 7 and 8. Current is conducted to coils 7 and 8 by contact springs 9 and 10 housed in tubes 11 and 12 in the base section of stator frame 4. Brushes 13 and 14 are in series with coils 7 and 8 and commutators 19 and 20.

Armature 15 is provided with integral reflector 23. Reflector 23 focuses light from bulb 3 into a beam 24 at an angle θ to the axis of rotation 25 of armature 15. Reflector 23 is coated with a reflective material on its inner surface and is provided with a mass 30 for dynamic and static balancing.

It is to be expressly understood that the configuration shown for reflector 23 is by way of illustration only, it being obvious that other shapes can be utilized to achieve any desired rotating pattern on the lens of the taillight. It is further within the concept of the invention to use a mask or a lens cooperating with armature 15 as the manner shown, to accomplish the objective of reflector 23.

Armature laminations 26 are surrounded by coils 16, 17 and 18. Three poles are provided in the conventional manner to facilitate self starting.

Bearing means is provided between armature 15 and stator 4 by balls 27 running in inner race 28 and outer race 29. Races 28 and 29 are integrally molded into stator 4 and armature 15 respectively.

Stator 4 and armature 15 are preferably made of high strength plastic, their respective metal elements being "potted" therein in a manner well known in the electronics art.

Figure 3:
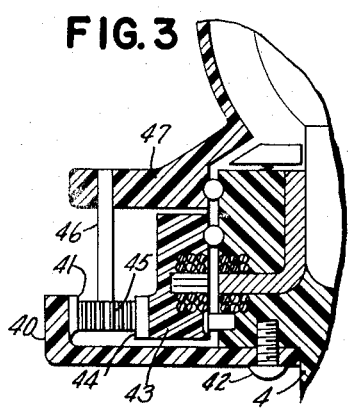
Fig. 3 is a fragmentary cross-sectional view of one type of gearing system usable with the rotating reflector.
Figure 2:
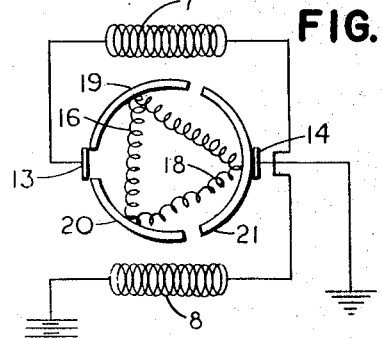
Figure 2 is a wiring diagram of the electrical circuit employed.
Figure 4:
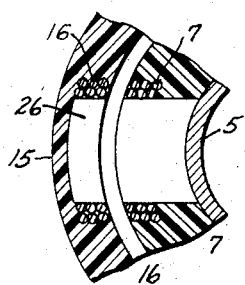
Fig. 4 is a cross-sectional view taken substantially along the line 4—4 of Fig. 1.

Armature 15 can be designed to rotate at any desired speed, however 200 r.p.m. has been found to be satisfactory. A gearing system for example, a conventional planetary gear system as shown in Fig. 3, can be provided between armature 15 and reflector 23 if it is desired to operate armature 15 at a higher speed. A ring gear 40 having internal teeth 41 is secured to the frame 4 as by a screw 42. An armature or sun gear 43 is provided with external teeth 4. A planetary gear 45 is meshed with the ring gear 0 and sun gear 43. The planetary gear 45 rotates on a shaft 46 that is connected to a reflector 47. Upon rotation of the armature 43, the planetary gear 45 is driven in the same direction thereby rotating the reflector 47.

A braking system is provided to stop rotation of reflector 23 immediately upon release of the brakes. Brake cone 31 is normally biased against reflector 23 by springs 32. When the circuit is activated by vehicle brake application, coils 7 and 8 are energized, magnetically attracting cone 31 against the action of springs 32. When the brakes are released, the flux circuit collapses releasing cone 31 to brake rotating reflector 23.

It is to be noted that the present invention is fail safe in operation in that the taillights, conventional brakelights and turn signals of the vehicle function in their normal manner. Rotating reflector 23 simply focuses a portion of the light from bulb 3 into a rotating beam. Another advantage of the present invention is its novel construction that allows installation on a vehicle without tools or without requiring any particular skill. Anyone capable of replacing a taillight bulb, can equip his motor vehicle with the safety device of the present invention.

I claim:

1. A signal device adapted to be inserted in the taillight bulb receptacle of a motor vehicle comprising a housing having a base projecting therefrom for engagement with said bulb receptacle, a terminal on said base for the electrical connection of said signal device in the brakelight circuit of said motor vehicle, a cavity in said housing having an inside diameter substantially equal to the inside diameter of said bulb receptacle and longitudinally aligned therewith, a light source in said cavity, a plurality of spaced field poles supported by said housing and disposed concentrically with respect to said cavity and radially outwardly spaced therefrom, means for inducing a magnetic flux in said field poles, an armature operably related for rotation with respect to said field poles, and concentrically disposed with respect to said cavity, bearing means for supporting said armature in operable relation with said field poles, and a reflector coupled with said armature for rotation therewith and about said cavity and reflecting light from said source.

2. A signal device for cooperation with the braking system of a motor vehicle so as to be energized thereby comprising a housing having a base portion engageable with the taillight bulb receptacle of said vehicle, a first terminal on said base portion for the electrical connection of said signal device in an electrical circuit energizable by said braking system, a cavity in said housing for the acceptance of a taillight bulb, a second terminal on said housing for electrically connecting said taillight bulb in said electrical circuit, a pair of magnetic field poles, an armature operatively related with said field poles so as to rotate with respect to said housing upon the energization of said electrical circuit by said brake system, and a reflector supported by said housing for rotation about said taillight bulb, rotation of said armature effecting rotation of said reflector whereby light is reflected therefrom in a moving beam.

References Cited in the file of this patent
UNITED STATES PATENTS

| | | |
|---|---|---|
| 1,885,714 | Hampton | Nov. 1, 1932 |
| 2,005,214 | Anderson | June 18, 1935 |
| 2,719,282 | Roth | Sept. 27, 1955 |